United States Patent

[11] 3,558,021

| [72] | Inventor | Ary van der Lely,<br>10, Weverskade, Maasland, Netherlands |
|---|---|---|
| [21] | Appl. No. | 772,509 |
| [22] | Filed | Nov. 1, 1968 |
| [45] | Patented | Jan. 26, 1971 |
| [32] | Priority | Nov. 3, 1967 |
| [33] | | Netherlands |
| [31] | | 6714944 |

[54] SPREADING IMPLEMENTS WITH INLET VALVE OPERATOR
22 Claims, 5 Drawing Figs.

[52] U.S. Cl. ............................................. 222/483,
285/24, 285/420
[51] Int. Cl. ............................................. B67d 3/00
[50] Field of Search ............................................. 222/482,
178, 176(Consulted), 483; 285/24, 27, 38(Inquired)
308, 320, 420; 141/346, 370,
373, 383, 231

[56] References Cited
UNITED STATES PATENTS

| 1,910,706 | 5/1933 | Malzard | 285/38X |
| 2,803,473 | 8/1957 | Hohmann | 285/24X |
| 3,420,452 | 1/1969 | Vaughan | 222/178X |
| 3,445,127 | 5/1969 | Clarke | 285/420X |

*Primary Examiner*—Stanley H. Tollberg
*Attorney*—Mason, Mason and Albright

ABSTRACT: This invention relates to implements for the spreading of liquid and semiliquid materials, such implements comprising a mobile container with an inlet port for introducing material to be spread into the container. The material may, for example, be liquid manure. The inlet port has a valve closure member which is operative by a remote control. An outlet with a closure member is also operative by the remote control. A hydraulic system can be connected to a coupling member which connects the inlet with a supply duct.

PATENTED JAN 26 1971

3,558,021

SHEET 1 OF 2

INVENTOR
ARY VAN DER LELY
Mason, Mason & Albright
Attorneys

INVENTOR
ARY VAN DER LELY
Mason, Mason & Albright
Attorneys

3,558,021

SPREADING IMPLEMENTS WITH INLET VALVE OPERATOR

Figure 1:
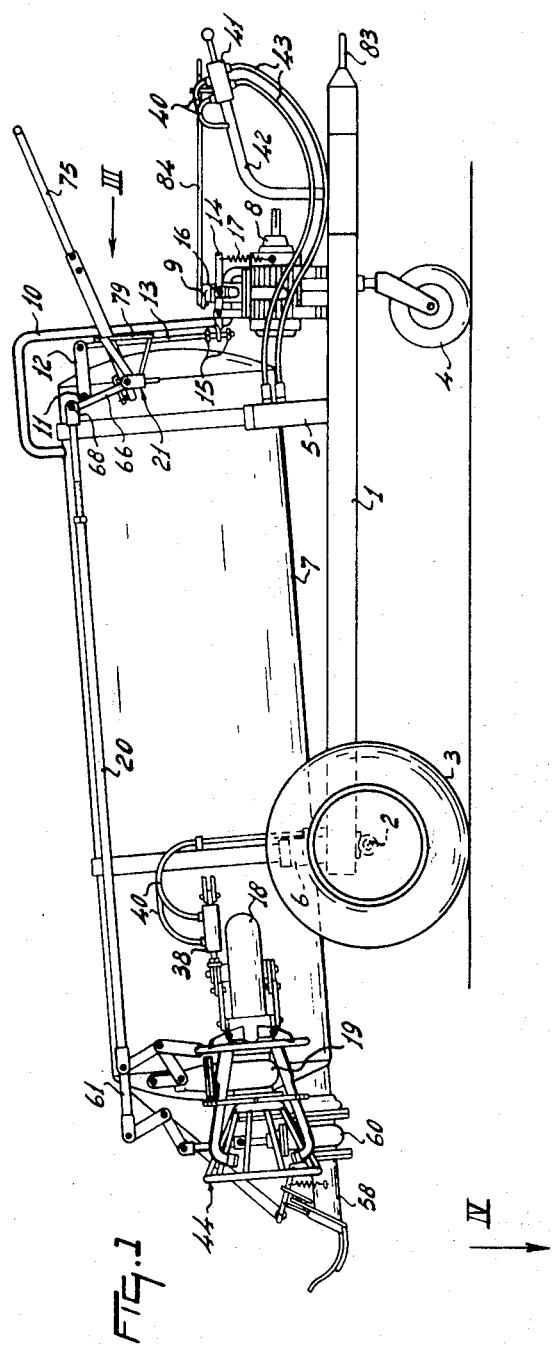
Figure 2:
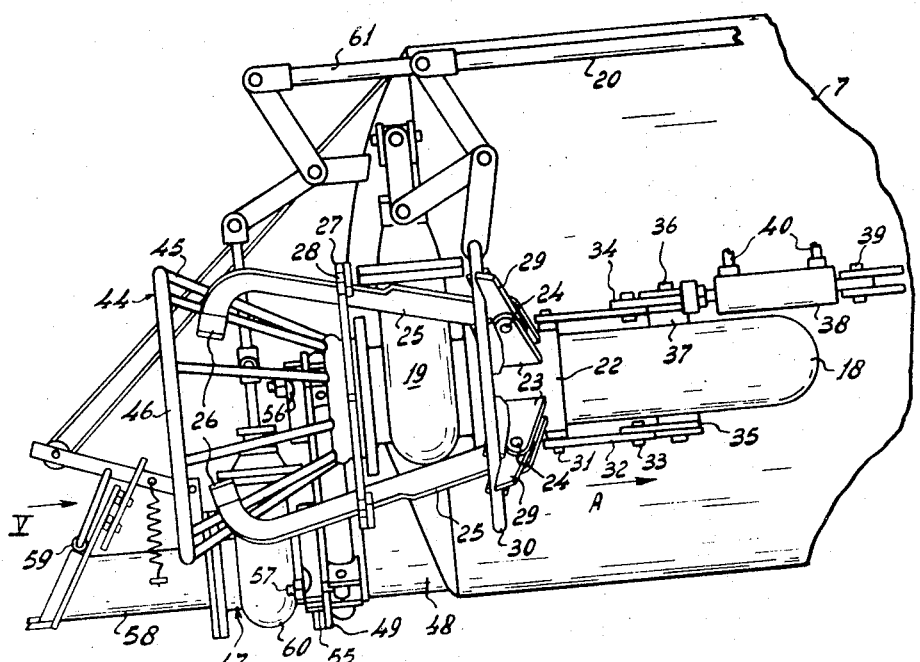
Figure 5:
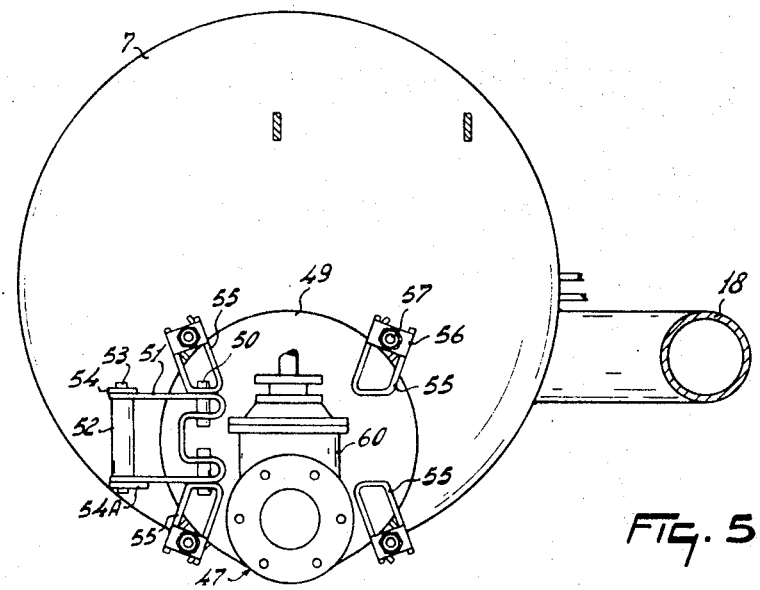

For a better understanding of the invention, and to show how the same may be carried into effect, reference will now be made, by way of example, to the accompanying drawings, in which:

FIG. 1 is a side elevation of a spreading implement in accordance with the invention, FIG. 2 is a side elevation of the rear of the implement of FIG. 1 showing various parts to an enlarged scale and in greater detail, FIG. 3 is a scrap view as seen in the direction indicated by the arrow III of FIG. 1, FIG. 4 is a plan view as seen in the direction indicated by the arrow IV in FIG. 3, and FIG. 5 is a view as seen in the direction indicated by the arrow V of FIG. 2, a number of the parts that are illustrated in the former figure being omitted.

Referring to the drawings, the implement which is illustrated is a mobile implement for the collection, transport and spreading of liquid and semiliquid materials such, in particular, as liquid manure. The implement has a frame 1 whose rear, relative to the intended direction of forward travel of the implement, is supported by a pair of large ground wheels 3 with the aid of a horizontal axle 2. The intended direction of forward travel of the implement which has just been mentioned is from right to left as seen in FIG. 1 of the drawings. A forward region of the frame 1 is supported by a single castor ground wheel 4. The frame 1 is provided with supports 5 and 6 which hold a container in the form of a tank 7 the longitudinal axis of which is gently inclined to the horizontal in such a way that the intersection of said axis with the rearmost wall of the tank is located at a lower level than the intersection of said axis with the foremost wall thereof. A double-acting pump 8 is mounted on the frame 1 in front of the tank 7 and is provided with a control cock 9 by which either the pressure side or the suction side of the pump 8 can be placed in communication with a duct 10. The duct 10 leads from the cock 9 to the interior of the tank 7 and opens into said tank in the uppermost region thereof.

A float (not visible in the drawings) is provided inside the tank 7 and is connected to a substantially horizontal shaft 11 that protrudes to the exterior of the tank and to the external end of which an arm 12 is secured. The end of the arm 12 remote from the shaft 11 is pivotally connected to the upper end of an approximately vertical rod 13 whose lowermost end is entered through a hole in an arm 14, adjustable stops 15 being mounted on the rod 13 both above and below the arm 14. The arm 14 is pivotally connected to the double-acting pump 8 and is provided with a valve 16 which, when in an open position, uncovers a hole in the duct 10 thus directly connecting the interior of that duct to the atmosphere. The valve 16 is, however, urged into a closed position by a light tension spring 17 which connects the end of the arm 14 remote from the rod 13 to the housing of the pump 8.

An inlet port 18 is provided towards the rear of the tank 7, said port 18 opening into one lateral side of the tank 7 but being directed rearwardly, at the exterior of the tank 7, in a direction parallel or substantially parallel to the longitudinal axis of the tank. The inlet port 18 is provided, adjacent its mouth, with a closure member 19 and this member is connected by a rod and lever system 20 to a control member 21 that is mounted near the front of the tank 7 and whose construction and arrangement will be described in detail below.

The inlet port 18 is surrounded, at the side of the closure member 19 remote from the mouth of said port, by an axially slidable support ring 22, said ring 22 carrying four pairs of lugs 23 at regular intervals around its exterior surface. Coupling arms 25 have their ends pivotally mounted between the lugs 23 of the various pairs by means of pins 24, the ends of the coupling arms 25 that are remote from the pins 24 being bent over inwardly towards the longitudinal axis of the inlet port 18 to form hooklike portions whose free ends have curved brackets 26 secured to them in approximately perpendicular relationship to the said hooklike portions of the arms 25. A star-shaped plate 27 is secured to the inlet port 18 at the same side of the closure member 19 as the mouth of said port, the plate 27 being formed with guide slots 28 through which the arms 25 are entered. The four arms 25 have projections 29 that are located adjacent the pins 24 about which said arms 25 are pivotable. The projections 29 are arranged to cooperate with an annular stop 30 which is secured to the inlet port 18 at the side of the closure member 19 remote from the mouth of said port.

The axially slidable support ring 22 has upper and lower stub shafts 31 to which the ends of corresponding arms 32 are pivotally connected. The opposite ends of the arms 32 are pivotally connected by pins 33 to further arms 34 and 35 respectively. The opposite ends of the arms 34 and 35 are fastened to a vertical shaft 36 which is turnable in a vertical bearing 37 fastened to the side of the tank 7. The arms 34 and 35 afford levers and the end of the arm 34 that is remote from the corresponding arm 32 is pivotally connected to the piston rod of a double-acting hydraulic piston and cylinder assembly 38, the cylinder of said assembly being itself pivotally connected to lugs carried by the tank 7 with the aid of a substantially vertical pin 39. Flexible hydraulic ducts 40 extend from the cylinder of the assembly 38 through the frame 1 to the leading end of a forwardly projecting support 42 (FIG. 1) mounted at the front of the implement. A hydraulic control valve 41 is mounted at this point and the ends of the ducts 40 remote from the assembly 38 are connected thereto. As can be seen in FIG. 1 of the drawings, further flexible ducts 43 are provided for placing the valve 41 in connection with the hydraulic system of a tractor or other vehicle to which the implement is coupled in the use thereof. FIG. 1 shows the flexible ducts 43 occupying the inoperative position which is employed when the implement is not in use.

A guide of capturing basket 44 (FIGS. 1 and 2) is mounted at the mouth of the inlet port 18, said basket 44 taking the form of an assembly of rigidly interconnected rods or bars 45 that are connected to a base ring 46 in the form of a frustoconical assembly which tapers from said base ring 46 to the mouth of the inlet port 18. It will be noted that the spaces between the equidistant rods or bars 45 are sufficiently large to enable the brackets 26 carried by the coupling arms 25 to pass through them.

An outlet port 47 (FIGS. 2 and 5) is provided in the lowermost region of the rear of the tank 7 and, in fact, projects from the cover 49 of a manhole or handhole 48. The circular cover 49 is connected by vertically aligned pins 50 (FIG. 5) to a bracket 51, this bracket carrying a vertical bearing 52 which establishes a pivotal connection with a vertical shaft 53 that is mounted between upper and lower lugs 54 and 54A that project from the rear most wall of the tank 7. The cover 49 is thus turnable about two parallel and substantially vertical axes one of which, as seen in FIG. 5, is within the circumference of the cover 49 while the other is outside that circumference. The cover 49 can be maintained in a closed condition by closing members in the form of four brackets 55 that are located at approximately 90° intervals around the circumference of said cover. The limbs of the brackets 55 are secured in their operative closing positions by clamps 56 and nuts or bolts 57.

The outlet port 47 is provided with a spreading member 58 whose mouth can be closed, or opened to a controlled extent, by an upwardly and downwardly displaceable slide 59 which may be constructed and arranged in a generally known manner which is not relevant to the present invention but that can be seen in outline in FIG. 2 of the drawings. The outlet port 47 is provided with a closure member 60 which, like the closure member 19, takes the form of a shutoff valve. The closure member 60 is also connected by a corresponding rod and lever system 61 to the aforementioned control member 21 that is disposed at the front of the tank 7, The control member 21 can be seen in FIGS. 1, 3 and 4 of the drawings and is connected to one side of the tank 7, at the front of that tank, by laterally projecting supports 62 and 63. The supports 62 and 63 carry a substantially horizontal shaft 64 around opposite end regions of which rockers 66 and 67 are turnable with the aid of corresponding sleeve bearings 65. The upper end of the rocker 66 is pivotally connected to the rod and lever system 20 by a pin 68 and the upper end of the rocker 67 is similarly connected to the rod and lever system 61 by a further pin 68. Each of the two rockers 66 and 67 includes a corresponding forwardly projecting arm 69 the leading end of which takes the form of a bent-over portion 70. Each portion 70 is formed with a corresponding hole 71. A bracket 72 is turnably mounted on the shaft 64 between the sleeve bearings 65 of the two rockers 66 and 67, the limbs of said bracket 72 extending rearwardly from the base of the bracket in divergent relationship. A pin 73 is carried by the base of the bracket 72 in such a way that its axis is substantially perpendicular to that of the shaft 64, said pin 73 establishing a pivotal connection between the bracket 72 and the limbs of a fork 74 mounted at one end of an adjusting lever 75. As can be seen best in FIG. 4 of the drawings, the limbs of the fork 74 lie between the divergent limbs of the bracket 72, the free end of the fork 74 being connected to the free ends of the limbs of the bracket 72 by aligned, and relatively opposed, tension springs 76, The adjusting lever 75 is provided at its opposite sides with catch dowels 77, these dowels being located at the same distance from the shaft 64 as are the holes 71 in the portions 70 of the arms 69. Strips 78 project forwardly from the supports 62 and 63 in gently convergent relationship and their leading ends carry a substantially vertical plate 79 that is formed with an inverted U-shaped opening which exhibits two vertical limbs 81 and 82 and an overlying substantially horizontal connection 80. The adjusting lever 75 is entered through the opening in the plate 79 and it will be seen from FIG. 3 of the drawings that the bottom of the connection 80 is formed with a groove in which said lever 75 can be lodged. The lever 75 can, of course, be moved into register with either the limb 81 or the limb 82 of the opening by turning it about the pivot pin 73 against the resilient opposition of one of the springs 76.

In the use of the spreading implement which has been described, a draw bar 83 at the leading end of its frame 1 is connected to the tow bar or hitch of an agricultural tractor or other vehicle. A splined and forwardly projecting rotary input shaft of the pump 8 is placed in driven connection with the power takeoff shaft of the same tractor or other vehicle by way of an intermediate telescopic transmission shaft (not shown) of known construction having universal joints at its opposite ends. The flexible ducts 43 are employed to connect the hydraulic control valve 41 to the hydraulic system of the same tractor or other vehicle. When the tank 7 is to be filled, the implement is towed alongside a settling pit, storage tank or the like that is provided with an outlet pipe or duct intended to cooperate with the inlet port 18 of the implement. The tractor or other vehicle manoeuvres the implement rearwardly until the delivery end of the pipe or duct that has just been mentioned is located inside the guide or capturing basket 44. As soon as this condition is reached, the hydraulic control valve 41 is operated to cause the assembly 38 to turn the lever arms 34 and 35 about the axis of the shaft 36 and move the support ring 22 axially along the inlet port 18 in the direction indicated by the arrow A in FIG. 2 of the drawings. The coupling arms 25 move in the same direction A and, as they move through the annular stop 30, they are caused to turn inwardly about the pins 24 to bring the brackets 26 through the rods or bars 45 and into clamping engagement with the delivery pipe or duct. It will be remembered that the brackets 26 simultaneously move in the direction A so that the mouth of the delivery pipe or duct is pressed into substantially fluidtight engagement with the mouth of the inlet port 18.

As soon as the fluidtight connection which has just been mentioned is established, the closure member 19 is opened with the aid of the rod and lever system 20 and the control member 21. The adjusting lever 75 can be reached from the driving seat of the tractor or other vehicle which operates the implement and the driver turns said lever 75 to the left (as seen in FIG. 3 of the drawings) about the pivot pin 73 to bring it into line with the upper end of the guide-slot limb 81 of the opening in the plate 79. It will be evident from FIG. 4 of the drawings that this movement enters one of the catch dowels 77 in that hole 71 that is formed in the limb 70 of the arm 69 forming part of the rocker 66. Upon turning the lever 75 downwardly about the shaft 64 to bring it to the lower end of the limb 81, the rocker 66 will be turned similarly and this causes the rod and lever system 20 to open the closure member 19. The pump 8 is then driven and a control arm 84 of the cock 9 is moved to place the duct 10 in communication with the suction side of said pump.

The pump 8 sucks the liquid or semiliquid material into the tank 7 through the inlet port 18 and overfilling of the tank 7, which would cause the duct 10 and the pump 8 to be fouled by said material, is avoided by virtue of the fact that, when the desired level of the material in the tank is reached, the float connected to the shaft 11 turns that shaft in a clockwise direction as seen in FIG. 1 of the drawings to move the rod 13 downwardly and bring the valve to its open position against the action of the light tension spring 17. The suction in the duct 10 is thus broken and no more material is introduced into the tank 7. The tank 7 may be formed with a window, or a gauge may be provided, to enable the operator to see the level of the material in the tank 7 at any time. As soon as the tank 7 has been completely filled, or filled to a desired extent, the adjusting lever 75 is returned to the groove in the connection 80 where it tends to remain under the action of the opposed springs 76. The hydraulic control valve 41 is then operated to cause the assembly 38 to move the support ring 22 in a direction opposite to the direction A thus releasing the delivery pipe or duct from the brackets 26 carried by the coupling arms 25. It will be noted that the projections 29 cooperate with the annular stop 30 in positively turning the arms 25 about the pins 24 to positions in which the brackets 26 are withdrawn outside the rods or bars 45 of the guide or capturing basket 44. The tractor or other vehicle then tows the implement to the field or plot of land which is to receive the liquid manure or other liquid or semiliquid material contained within the tank 7 and it will be noted that, since the closure member 19 is very close to the mouth of the inlet port 18, that is to say, between the coupling mechanism and said mouth, very little, if any, material remains in the mouth to leak onto the ground during transport once the closure member 19 has been shut.

When the field or other spreading site is reached, the closure member 60 of the outlet port 47 is opened by bringing the adjusting lever 75 to the bottom of the right-hand (as seen in FIG. 3 of the drawings) guide-slot limb 82 of the opening in the plate 79. It will be evident from the previous description that this movement couples the lever 75 with the arm 69 of the rocker 67 and causes the rod and lever system 61 to open the closure member 60. It will be apparent that the same adjusting member 21 is used to open and shut the closure members 19 and 60 of both the inlet and outlet ports 18 and 47 independently of one another. As soon as the closure member 60 is open, the spreading operation can be commenced by driving the pump 8, moving the control arm 84 to place the duct 10 in communication with the pressure side of said pump and moving the slide 59 upwardly to open the discharge mouth of the spreading member 58 to a desired extent. The slide 59 can also be moved from the driving seat of the tractor or other operating vehicle with the aid of a control which is not shown in the drawings. The connection of the cover 49 to the manhole or handhole 48 by way of pivots affording two relatively spaced but parallel axes enables said manhole or handhole 48 to be shut effectively and securely but the arrangement is such that the cover 49 can be brought well clear of the mouth of said manhole or handhole 48 when required to enable the interior of the tank 7 to be reached for cleaning, maintenance and other purposes.

I claim:

1. An implement for spreading liquid manure comprising a frame and a tank mounted on said frame, an inlet connected to the interior of said tank and a valve closure member adjacent said inlet, a coupling mechanism for connecting said inlet to a supply duct, said coupling mechanism being operatively associated with remote control means whereby an operator can place said tank in communication with a source of supply through said inlet and duct with said control means, said valve closure member being located between said coupling mechanism and said inlet, said coupling mechanism having coupling parts which project past said valve closure member, said coupling parts including arm means pivotally connected to a support and said support being displaceably mounted relative to said inlet at the side of said valve closure member remote from the mouth of said inlet.

2. An implement as claimed in claim 1, wherein said arm means can be moved to connect and disconnect the supply duct to said inlet.

3. An implement as claimed in claim 2, wherein said inlet includes an elongated tube with a mouth and said arm means is movable in a direction approximately parallel to the length of said inlet.

4. An implement as claimed in claim 1, wherein said arm means terminates in hooklike portions.

5. An implement as claimed in claim 1, wherein said arm means includes four spaced-apart coupling arms.

6. An implement as claimed in claim 5, wherein said support is slideable along said inlet.

7. An implement as claimed in claim 6, wherein a stop is located adjacent said valve closure member remote from the mouth of said inlet, said arms having projections which cooperate with said stop to turn said arms about their pivotal mountings, said stop having an annular configuration and being positioned whereby each arm is movable through a space between said stop and said inlet.

8. An implement as claimed in claim 7, wherein guide means for said coupling arms is mounted adjacent said valve closure member.

9. An implement as claimed in claim 8, wherein said guide means comprises an element with slots which receive said arms, said inlet including an elongated tube and said slots extending radially relative to the longitudinal axis of said inlet.

10. An implement as claimed in claim 6, wherein said support is connected to a hydraulic piston and cylinder assembly through pivotable lever means whereby said support is slideable responsive to movements of said assembly.

11. An implement as claimed in claim 1, wherein said inlet is surrounded by a capturing basket that receives said supply duct, said arm means terminating in hooklike portions and said portions being arranged to effect connection and disconnection of the supply duct within said capturing basket, said capturing basket being a frustoconical assembly of equidistantly spaced bars that converge towards the mouth of said inlet.

12. An implement as claimed in claim 1, wherein said tank has an outlet port for conducting material to be spread, said outlet port having closure means which is operable independently of said valve closure member of said inlet, a common control member connected to said valve closure member and said closure means.

13. An implement as claimed in claim 1, wherein said tank has an outlet port on a cover and said cover is pivotable about two relatively spaced axes.

14. An implement as claimed in claim 13, wherein said two axes are parallel to one another, whereby one of said spaced axes extends within the circumference of said cover and a second of said spaced axes is located outside of said circumference.

15. An implement for spreading liquid manure comprising a frame and a tank mounted on said frame, an outlet port in said tank for conducting material out of said tank and an inlet port communicating with the interior of said tank for receiving a supply of material, said inlet having a valve closure member and said outlet having closure means, a common control member connected to said closure member and said closure means to actuate same independently of each other, said inlet and outlet ports being located adjacent the rear end of said tank and said control member having an adjusting lever positioned at the forward end of said tank for manipulation by an operator to control said closure member.

16. An implement as claimed in claim 15, wherein said adjusting lever is associated with rod and lever system means, said system means being connected to said valve closure member of said inlet and said closure means of said outlet port.

17. An implement as claimed in claim 16, wherein said control member includes spaced-apart rocker parts and said adjusting lever is pivotally mounted between said parts, said rod and lever means comprising two portions, a first of said portions being connected to a first rocker part and said valve closure member and a second of said portions being connected to a second rocker part and said closure means, said rocker parts cooperating with a catch on said adjusting lever when the latter is moved to operative positions.

18. An implement as claimed in claim 17, wherein said adjusting lever is turnable about two mutually perpendicular axes, whereby one of said axes is substantially horizontally disposed and the other axis is contained in a substantially vertical plane.

19. An implement as claimed in claim 18, wherein said adjusting lever is connected to the first and the second of said portions of said rod and lever system means when said lever is turned first in one direction and then in a second direction, respectively about said axis contained in a substantially vertical plane.

20. An implement as claimed in claim 19, wherein said adjusting lever has catch dowels at its opposite sides, said catch dowels being positioned to enter holes in said rocker parts.

21. An implement as claimed in claim 17, wherein a spring mechanism is connected to said control means to urge said adjusting lever in a central inoperative position.

22. An implement as claimed in claim 21, wherein said control member includes elongated guides that retain said adjusting lever in connection with either of said portions, said guides extending parallel to one another.